US 6,529,996 B1

(12) United States Patent
Nguyen et al.

(10) Patent No.: US 6,529,996 B1
(45) Date of Patent: Mar. 4, 2003

(54) NETWORK ATTACHED VIRTUAL TAPE DATA STORAGE SUBSYSTEM

(75) Inventors: Thai Nguyen, Thornton, CO (US); Robert Michael Raymond, Boudler, CO (US); Michael Lawrence Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/343,512

(22) Filed: Jun. 30, 1999

Related U.S. Application Data (63) Continuation of application No. 08/815,739, filed on Mar. 12, 1997, now abandoned.

(51) Int. Cl.[7] .............................................. G06F 12/00
(52) U.S. Cl. ....................... 711/114; 711/209; 711/202; 711/170
(58) Field of Search ................................ 711/112, 100, 711/4, 6, 203, 114, 111, 209, 202; 369/34, 30; 714/6

(56) References Cited

U.S. PATENT DOCUMENTS

| | | |
|---|---|---|
| 3,130,387 A | 4/1964 | Wright et al. |
| 3,699,533 A | 10/1972 | Hunter |
| 3,806,888 A | 4/1974 | Brickman et al. |
| 3,909,799 A | 9/1975 | Recks et al. |

(List continued on next page.)

FOREIGN PATENT DOCUMENTS

| | | |
|---|---|---|
| CA | 892798 | 2/1972 |
| CA | 907211 | 8/1972 |

(List continued on next page.)

OTHER PUBLICATIONS

R. Bair, "Virtual storage Architecture Guide", IEEE Symposium on Mass Storage Systems, pp. 312–326, 1995.*

(List continued on next page.)

Primary Examiner—Matthew Kim
Assistant Examiner—Pierre-Michel Bataille
(74) Attorney, Agent, or Firm—Duft, Graziano and Forest Brooks & Kushman P.C.; Wayne P. Bailey (57) ABSTRACT

The network attached virtual tape storage subsystem interconnects a plurality of tape devices with a plurality of data processors via a high bandwidth switching network to implement a virtual, distributed tape data storage subsystem. The virtual, distributed tape data storage system realizes multiple virtual devices, which are available to any of the data processors and the bandwidth of the system is scalable and can be changed on demand. The virtual tape storage subsystem is managed by a system controller which contains a plurality of software elements including: resource allocation, resource configuration, and resource management. The use of a networked storage manager enables the tape devices to be managed as a pool and yet attach the tape devices directly to the network as individual resources. The networked storage manager must provide the mechanism for the enterprise management to control tape device allocation and configuration as well as other functions, such as tape cartridge movement and data migration.

26 Claims, 4 Drawing Sheets

U.S. PATENT DOCUMENTS

| | | |
|---|---|---|
| 3,949,377 A | 4/1976 | O'Neill, Jr. |
| 3,976,977 A | 8/1976 | Porter et al. |
| 4,021,782 A | 5/1977 | Hoerning |
| 4,040,026 A | 8/1977 | Gernelle |
| 4,054,951 A | 10/1977 | Jackson et al. |
| 4,080,651 A | 3/1978 | Cronshaw et al. |
| 4,080,652 A | 3/1978 | Cronshaw et al. |
| 4,084,234 A | 4/1978 | Calle et al. |
| 4,086,629 A | 4/1978 | Desyllas et al. |
| 4,110,823 A | 8/1978 | Cronshaw et al. |
| 4,123,795 A | 10/1978 | Dean, Jr. et al. |
| 4,126,893 A | 11/1978 | Cronshaw et al. |
| 4,126,894 A | 11/1978 | Cronshaw et al. |
| 4,158,235 A | 6/1979 | Call et al. |
| 4,215,400 A | 7/1980 | Denko |
| 4,228,501 A | 10/1980 | Frissell |
| 4,241,420 A | 12/1980 | Fish et al. |
| 4,246,637 A | 1/1981 | Brown et al. |
| 4,276,595 A | 6/1981 | Brereton et al. |
| 4,298,932 A | 11/1981 | Sams |
| 4,310,883 A | 1/1982 | Clifton et al. |
| 4,318,184 A | 3/1982 | Millett et al. |
| 4,327,408 A | 4/1982 | Frissell et al. |
| 4,412,285 A | 10/1983 | Neches et al. |
| 4,414,644 A | 11/1983 | Tayler |
| 4,533,995 A | 8/1985 | Christian et al. |
| 5,454,103 A * | 9/1995 | Coverston et al. .......... 707/205 |
| 5,455,926 A * | 10/1995 | Keele et al. .................... 711/4 |
| 5,546,557 A * | 8/1996 | Allen et al. ................. 711/111 |
| 5,566,331 A * | 10/1996 | Irwin, Jr. et al. ............. 707/10 |
| 5,568,629 A * | 10/1996 | Gentry et al. ............... 711/114 |
| 5,625,405 A * | 4/1997 | DuLac et al. ................... 348/7 |
| 5,805,864 A * | 9/1998 | Carlson et al. ............. 711/114 |
| 5,867,648 A * | 2/1999 | Foth et al. ................... 709/230 |
| 5,893,919 A * | 4/1999 | Sarkozy et al. ............. 711/114 |
| 5,954,796 A * | 9/1999 | McCarty et al. ............ 370/241 |
| 5,987,566 A * | 11/1999 | Vishlitzky et al. .......... 711/114 |
| 5,996,024 A * | 11/1999 | Blumenau ................... 709/301 |
| 6,044,442 A * | 3/2000 | Jesionowski ................ 711/100 |
| 6,141,729 A * | 10/2000 | Ishida et al. ................. 711/114 |
| 6,154,854 A * | 11/2000 | Stallmo ......................... 714/6 |
| 6,216,202 B1 * | 4/2001 | D'Errico ..................... 711/112 |

FOREIGN PATENT DOCUMENTS

| | | |
|---|---|---|
| GB | 1167762 | 10/1969 |
| GB | 1353770 | 5/1974 |
| GB | 1359662 | 7/1974 |
| GB | 1496779 | 1/1978 |
| GB | 1496780 | 1/1978 |
| GB | 1547381 | 6/1979 |
| GB | 2063532 B | 6/1981 |
| JP | 51-18409 | 2/1976 |
| JP | 52-106641 | 9/1977 |
| JP | 53-22331 | 3/1978 |
| JP | 53-84632 | 7/1978 |
| JP | 53-98741 | 8/1978 |
| JP | 53-108747 | 9/1978 |
| JP | 55-153058 | 11/1980 |
| JP | 55-164958 | 12/1980 |
| JP | 4-48250 | 8/1992 |

OTHER PUBLICATIONS

A. L. Busk et al., "The Storage server as Virtual Volume Manager", IEEE Symposium on Mass Storage Systems, pp. 79–86, 1993.*

Richard V. Keele, "Optical storage: Terabytes On–Line for IBM Mainframes", Data/Ware Development, Inc., pp. 68–71, 1988.*

Shared Virtual Storage System, System Description, 1979, pp. 1–14, Masstor Systems Corporation, Sunnyvale, California.

Shared Virtual Storage System, System Overview, 1980, pp. 1–60, Masstor Systems Corporation, Sunnyvale, California.

Digest Of Papers, The Gap Between MSS Products and User Requirements, Fourth IEEE Symposium on Mass Storage Systems, Apr. 15–17, 1980, pp. 1–76, Nat'l Center for Atmospheric Research, Boulder, Colorado.

FPEXEC File Processor Executive Program Logic Manual, Oct. 18, 1982, p. 1–177, MASSTOR Systems Corp., Sunnyvale, California.

Waddell, J.M. and Way, D.L., Channel Scheduling By A Control Unit, IBM Technical Disclosure Bulletin, vol. 17, No. 9, Feb. 1975.

Liptay, J.S., Structural Aspects of the System/360 Model 85, IBM Systems Journal, pp. 1–14, vol. 7, No. 1, 1968.

Meade, Robert M., How a cache memory enhances a computer's performance, Electronics, Jan. 17, 1972, pp. 58–63.

Smith, Alan Jay, Directions For Memory Hierarchies And Their Components: Research And Development, 1978.

Christman, R.D., Collins, M.W., Devaney, M.A., Willbanks, E.W., A Network File Storage System, UC–32, 7–81, pp. 1–14.

Reference Manual for IBM 3830 Storage Control Model 1 and IBM 3330 Disk Storage, GA26–1592–5, File No. S360/S370–07, pp. 1–101.

Porter, James N., The Disk Drive Industry, IEEE Transactions On Magnetics, vol. MAG–14, No. 4, Jul. 1978, pp. 149–153.

Puthoff, S.H., Technical Innovations In Information Storage And Retrieval, IEEE Transactions On Magnetics, vol. MAG–14, No. 4, Jul. 1978, pp. 143–148.

Boggs, Jr., Virtual Input/Output Channels For A Digital Computer, IBM Tech. Disc. Bull., vol. 20, No. 1, Jun. 1977, pp. 110–112.

Nishimukai, T., Tsujioka, S., Kadono, S., Chiba, T., Universal IO Device Controller By Using Programmable Logic Arrays, IEEE 1978, pp. 477–480.

Christman, R.D., Collins, M.W., Devaney, M.A., Willbanks, E.W., A Network File–Storage System, Los Alamos Scientific Laboratory, LA–8887–MA, pp. 1–14.

Chorn, G.E., Christman, R.D., Klingner, C.T., The Standard File Transport Protocol, LA–7388–MS Informal Report UC–32 Issued: Aug. 1978.

Mitchell, Jr., M.J., Diskette Load/Dump Control, IBM Tech. Disc. Bull. vol. 20, No. 4, Sep.–1977, pp. 1359–1361.

Collins, M.W., Mass Storage at LASL, Los Alamos Scientific Laboratory, pp. 95–112.

The TBM Mass Memory System, Ampex Corporation, Sunnyvale, CA, pp. 1–30.

Crittendon, Jr., W.C., Operational Characteristics Of The NCAR Mass Storage Device, pp. 48–50.

Howie, Jr., H. Robert, More Practical Applications Of Trillion–Bit Mass Storage Systems, Advanced Systems Dept./Ampex Corp., Sunnyvale, CA.

Shell Oil Company Purchase Order, Purchase Order No. SH–84378–JLH, Dec. 18, 1978 w/Agreement Between Masstor Systems Corporation and Shell Oil Co. as an attachment.

Masstor, MC Series Computer, Specifications.

Blood, P.M., Christman, R.D., Collins, M.W., Willbanks, E.W., Common File System Specifications, LA–7065–MS Informal Report, 09–77, pp. 1–15.

IBM 3850 Mass Storage System (MSS) Introduction and Preinstallation Planning, GA32–0038–1, File No. S370–07.

IBM System/370 Principles of Operation, GA22–7000–8, File No. S370–01.

IBM 3850 Mass Storage System (MSS) Principles of Operation: Theory, GA32–0035–1, File No. S370–07.

Garth A. Gibson. Network–Attached Secure Disks (NASD). ARPA ITO Scalable Systems and Software. pp. 1–24.

* cited by examiner

NETWORK ATTACHED VIRTUAL TAPE DATA STORAGE SUBSYSTEM

This is a continuation of application Ser. No. 08/815,739 filed Mar. 12, 1997 now abandoned.

FIELD OF THE INVENTION

This invention relates to tape data storage systems and, in particular, to a plurality of tape devices which are connected to a plurality of data processors via a network and which collectively implement a virtual, distributed tape data storage subsystem. The virtual, distributed tape data storage subsystem realizes multiple virtual devices, which are available to any of the data processors via the network which has a scalable bandwidth and can be changed on demand.

Problem

It is a problem in the field of data storage subsystems to provide adequate data storage service to the data processors that are connected to the data storage devices. There are numerous data storage media in use as well as corresponding data storage subsystem configurations which attempt to improve the data storage capabilities of the data storage media that is used to implement the data storage devices. For example, increases in the area density of data storage products translate into lower data storage costs per bit, but do not always yield higher data transfer rates. To achieve increased data transfer rates requires architectural approaches to data storage rather than data storage device improvements. One other aspect of this data storage problem is that the allocation of customer data to a single type of data storage media represents a limitation when faced with widely varying data storage needs. This limitation can be partly obviated by balancing I/O activity across an array of data storage devices of a data storage subsystem. However, a fixed array configuration of data storage devices also limits the scalability in performance and provides no facility for applications to request changes in performance. An architecture where the data storage devices are located behind a server further limits the delivered performance since the bandwidth is limited by the server itself. Therefore, architecting a data storage subsystem that can efficiently serve the needs of the applications extant on the data processors is a daunting problem. There are numerous factors which effect performance and this problem is particularly pertinent to tape devices, since the tape media is experiencing significant enhancements to its data storage capacity.

The traditional tape device is directly connected to a single data processor in a dedicated tape device configuration. The data processor has exclusive use of the tape device and typically communicates with the tape device via a SCSI interface. However, the use of dedicated tape devices is an expensive proposition where there are a plurality of data processors to be served, especially if the data access loads generated by the plurality of data processors are erratic. In this data storage subsystem architecture, the utilization of the tape devices and the efficiency of the data storage function are less than optimal, since each data processor is limited to its dedicated tape device and its physical constraints.

An alternative data storage subsystem architecture is to connect a plurality of tape devices along with a plurality of data processors to a common data communication network. In this architecture, the data processors all have access to all of the tape devices. The data processors run tape server software to manage the access protocol for the plurality of tape devices. Among the problems with the network interconnected tape devices is that it is difficult to share a tape device among a plurality of data processors. To provide enhanced response time, the tape devices can be served by an automated tape cartridge library system which mounts/dismounts the tape cartridges for the plurality of tape devices served by the automated tape cartridge library system. However, the tape cartridge library systems typically have a SCSI interface in the data path, and the SCSI interface introduces a number of physical limitations to the operation of the automated tape cartridge library system. The first limitation is that only a small number of tape devices can be attached to a SCSI bus compared to other bus architectures. The second limitation is the limited bandwidth of the SCSI bus that is shared by these tape devices. The length of the SCSI cable may also represent an additional limitation, since the length of the SCSI bus is typically limited to 25 feet.

A variation of this network data storage architecture is the use of a plurality of tape devices configured into a tape array. The tape devices are configured in a redundant array of data storage devices in a manner analogous to the Redundant Array of Inexpensive Disks (RAID) which is a well known architecture in the disk device technology. The tape array is typically located behind a server, which is directly connected to the network, and the bandwidth for data transfers between the data processors and the tape array is not scalable and is also limited by the characteristics of the server. The tape array itself is also not scalable or easily changed due to the server limitation.

These various tape device based data storage subsystem architectures are all limited in their data exchange bandwidth and are restricted by the use of a single data storage media. The alternative to a single media data storage subsystem is the integration of a plurality of data storage media types and data storage subsystem architectures into a single data storage subsystem, typically termed a mass storage subsystem. One such data storage subsystem designed to address this problem is the mass storage system described in the paper by Sam Coleman and Steve Miller titled "Mass Storage System Reference Model: Version 4", published May 1990 by the IEEE Technical Committee on Mass Storage Systems and Technology. This mass storage system interconnects a plurality of data processors with a diversity of data storage subsystems via a high bandwidth switched network for the transmission of data therebetween at high data transfer rates. A separate network is used to interconnect the data processors with the mass storage system controller, which manages the processing of data transfer requests received from the data processors over the control network. The mass storage system controller is directly connected to the controllers of the various data storage subsystems and transmits data file retrieval requests to the selected controller in response to the received data file request received from the data processors. The file staging process used therein copies a data file in its entirety from the mass storage system to the client data processor via the high bandwidth network before the user accesses any of the requested data. Usually the data file is staged from an archival storage device, but staging from a direct access storage device is possible as well. File staging is initiated by a client data processor transmitting a request to the mass storage system identifying the data file by name. The mass storage system maintains mapping information indicative of the physical memory storage location occupied by the requested data file. The retrieved mapping information is used by the mass storage system to transmit a file retrieval request to the archival storage device on which the requested data file is stored. Upon receipt of this request, the designated storage device copies the requested data file over the high speed network to a local, direct access data storage device that serves the requesting client data processor.

A significant limitation of this architecture is that the data is managed on a data file basis. Each client data processor request for a data file causes the mass storage system to access the mapping tables to locate the requested data file. When a client data processor sequentially accesses a plurality of data files, the mass storage system must successively access the mapping tables to identify each requested data file. As the extent of the mass storage system data storage capacity increases, the size and extent of the mapping tables proportionately increases and the time required to retrieve mapping information for each data file becomes a significant performance limitation of the mass storage system.

An improvement to the mass storage system is disclosed in the paper by J. L. Sloan et al, titled "MaSSIVE™: The Mass Storage System IV Enterprise", published April 1993 in the Proceedings of the IEEE, Vol. 81, No 4 and also disclosed in U.S. Pat. No. 5,566,331. The MaSSIVE mass storage system stages entire file-systems as bit files between archival storage devices and direct access storage devices. Because these direct access storage devices are channel-attached to the client data processor, the file-systems contained thereon may be efficiently accessed by the client data processors exactly as if they were located on local data storage devices. Since entire file-systems are staged rather than individual data files, staging becomes less convenient to the user since multiple, associated file sets are staged together. On the other hand, by staging whole file-systems without interpretation to a storage device which is channel-attached to the client data processor, the inefficiencies and bottlenecks of network file service are avoided. Thus, this mass storage system design combines the benefits of file staging and network file service, but at the same time minimizes the drawbacks of each.

Thus, the use of a plurality of different types of media in a mass storage subsystem presents its own set of problems. With advances in massively parallel processing, there is a need for interconnection networks that provide high bandwidth inter-process communications and data storage configurations that match the high bandwidth network capacity. There is also a need for data storage devices that can scale in capability or capacity of data storage and data transfer throughput. These data storage devices should be accessible via a high bandwidth switched network, such that a plurality of paths and links are provided between the data processor and the data storage devices. The data storage devices should be directly connectible to the switching network and not captive behind a server to thereby increase data throughput. The data transfers should be operational without the need to expend processing resources and the data storage devices should be shared among multiple data processors. The above-noted mass storage systems address the issue of utilizing the high bandwidth network that interconnects the data processors with the data storage subsystems to a high degree of efficiency. However, the data storage subsystems described therein represent archival data storage subsystems and are not efficiently used for simple routine data file access. In addition, the data storage image of the various data storage subsystems are immutable and the mass storage system controller simply functions as a data transfer manager to ensure that the data files or file systems are relocated from the archival data storage subsystem to the local data storage maintained by the data processors. There is no attempt to address the issue of the local storage element used by the data processors. Thus, the local storage systems described in the mass storage system publications suffer the limitation described above with respect to the tape devices.

Solution

The above described problems are solved and a technical advance achieved in the field by the network attached virtual tape storage subsystem of the present invention. This invention relates to tape data storage systems and, in particular, to a plurality of tape devices which are connected to a plurality of data processors via a high bandwidth switching network and which collectively implement a virtual, distributed tape data storage subsystem. The virtual, distributed tape data storage system incorporates elements from the mass storage system technology as well as tape device data storage subsystem architectures to realize multiple virtual devices, which are available to any of the data processors and the bandwidth of the system is scalable and can be changed on demand. By pooling the tape devices together, and interconnecting them with the data processors via a fiber data network, the problems of prior art tape device data storage subsystem architectures are overcome. This architecture realizes multiple virtual devices, which are available to any of the data processors. This architecture enables any tape array to be realized, including, but not limited to: RAIT 0, 1, 3, 4, 5, and the tape array and data transmission bandwidth can be dynamically reconfigured, since the network switchably interconnects the tape devices to the data processors.

The virtual tape storage subsystem is managed by a system controller which contains a plurality of software elements including: resource allocation, resource configuration, and resource management. The system controller may also contain security software for authentication. The resource allocation software has the responsibility to keep track of the resource usage such as which data processor presently owns the tape device, which tape devices are free to be allocated to the requesting data processors and the like. The resource configuration software allows an operator to configure the data storage resources for the data processors which are attached to the network. The operator can assign the maximum number of tape devices that a data processor can designate the configuration of these tape devices. The resource configuration software automatically configures both the tape devices allocated to a data processor as well as the connection between the data processor and a tape device(s). The resource management software queues the request for the resource allocation and notifies the data processor when the requested resource is ready, or it can schedule the availability of the resources.

The use of a networked storage manager enables the tape devices to be managed as a pool and yet attach the tape devices directly to the network as individual resources. The networked storage manager must provide the mechanism for the enterprise management to control tape device allocation and configuration as well as other functions, such as tape cartridge movement and data migration. The rules which could be implemented address response time constraints, data file transfer size, data file transfer rates, data file size bounds and the like. The networked storage manager manages the allocation, configuration and security.

DETAILED DESCRIPTION

In order to avoid ambiguity in the description of the network attached, distributed, virtual tape storage subsystem, the following set of definitions are provided. These definitions represent industry accepted interpretations of the terms of art used in the data storage technology art.

Definitions

A channel is typically a specialized, high speed, point-to-point hardware connection between a data processor and a device controller. A channel allows the data processor to send requests represented in a particular controller's command language to that controller and to receive responses from the controller, in order to cause a storage device attached to that controller to access and alter data blocks stored on that storage device.

A controller is a hardware device onto which is attached one or more storage devices (either direct or sequential access). The storage devices attached to a particular controller can be uniquely identified by ordinal numbers. The controller maps requests by a data processor for operations on blocks into the hardware operations understood by the storage device. Requests to a controller from a data processor are represented in a command language understood by the controller.

A data file (or simply "file") is a sequential collection of bytes. Not all files have the same number of bytes. Bytes may be added to or removed from a file, so that a single file may change in size. Each byte in a file may be uniquely identified by an ordinal number. The first byte in a file is byte zero. Files allow a collection of bytes to be operated on as a group.

The term data processor means the same thing as the terms computer, computing system, and computer system, and encompasses all forms of digital, stored program computers including but not limited to supercomputers, workstations, PCS, personal computers, minicomputers, mainframes, microcomputers, and servers. A device driver is a portion of the operating system which maps the file-system code I/O requests for operations on blocks inside a particular file-system into the appropriate I/O command language for the device controller to which is connected the direct access storage device which contains the particular file-system blocks being accessed. Different device controllers require different I/O command language, and an operating system frequently has several different device drivers, one for each different type of device controller. Only the device driver for a particular controller needs to understand the I/O command language for that controller. Because a device driver presents a common interface to the file-system code, regardless of the differences of the individual device controllers, the file-system code can issue a set of I/O requests that is common to all device controllers, even though the controllers may be different one from another.

A direct access storage device is a hardware device which stores a collection of blocks, and a mechanism which allows the accessing and/or alternating of any one of the blocks without accessing or altering any of the other blocks on the direct access storage device. Such a method of access means that the time or effort to access any particular block is approximately the same to access any other block on the device. This type of access is often referred to as random access. The number of blocks on a particular direct access storage device is fixed. All blocks on a particular direct access storage devices are the same size. The blocks on a direct access storage device are uniquely identified by an ordinal number, with the first block on the device identified by ordinal value zero. An example of a direct access storage device is a magnetic disk device.

A directory is a file that defines a set of files. By definition, a directory may also contain other directories, so that a hierarchical organization of files and directories may be defined. Each entry (file or directory) in a particular directory is uniquely identified by a file name. Files and directories may be added to and removed from a directory, or moved out of one directory and into another, so that directories may change in size, and not all directories are the same size. Directories allow a collection of files and directories to be operated on as a group. Since the information about what files or directories are contained in a directory is stored as bits within one or more blocks, just as the information in a file is stored as bits within one or more blocks, a directory can be seen as a special type of file. The difference is in how the bits that are part of the directory are interpreted.

File staging or simply staging is the process by which a data file, bit file or file-system is copied in its entirety from one storage device to another. Typically, staging occurs between archival storage devices and direct access storage devices. Staging can also occur between storage devices belonging to a client data processor and storage devices belonging to a mass storage system. The process of staging usually occurs at the beginning and ending of a file access operation. Typically, a file is staged from an archival device prior to a direct access storage device prior to data access by the client data processor, while the file is staged from a direct access storage device to an archival storage device after the client data processor is finished accessing the data.

A file-system is a self-contained, self-defining hierarchical collection of data files and directories, and is composed of a sequential collection of blocks which are uniquely identified by a set of ordinal numbers, with the first block identified by ordinal value zero. The structure of a file-system and the organization of the files contained within the file-system is defined solely by information contained in the file-system itself. The file-system contains all of the blocks composing all of the files and directories that are part of it. In addition, the file-system contains information defining which blocks belong to what files and directories, and in what order they occur inside each file and directory. This additional information is stored as bits in blocks on the storage device along with the blocks composing the files and directories inside the file-systems. Files and directories can be added to and removed from a file-system, and they can be moved from one file-system to another. Thus, a file-system can be thought of as nothing more than a collection of blocks on a storage device, or if the contents of the file-system blocks are interpreted, a file-system may be thought of as self-contained, self-defining hierarchical collection of data files and directories. A particular file within the hierarchy of directories and files within the file-system may be identified within the hierarchy by naming the file's path name. A particular byte within any file can be identified by a combination of path name (to identify the specific file) and the ordinal number identifying the byte within the file.

Blocks are a physical organization imposed on collections of bits by hardware storage devices (both direct and sequential access) for reasons of ease of implementation. Bytes, files and directories are a conceptual organization imposed on collections of bits by software for the convenience of users. A file-system defines a mapping of the conceptual organization into the physical organization, by defining a mapping of files and directories onto blocks stored on a direct access storage device. A file-system allows a collection of files and directories to be stored, accessed, and altered, on storage device, and to be operated on as a group.

A mass storage system is a collection of hardware and software distinct from the client data processors that permanently/semi-permanently stores, and operates to provide access by the client data processors to, bits, bytes, blocks, bit files, files, and/or file-systems that are not permanently/semi-permanently stored in the client data processor memories. Conceptually, a direct access storage device that is channel-connected to a client data processor can be considered to be a mass storage system. However, the term mass storage system usually applies to a larger and more complicated set of storage equipment and software than is encompassed by a single direct access storage device.

Network file service refers to a method of accessing a file-system by a client data processor via a network when the subject file-system is remotely located from the client data processor. The file-system being accessed is located on a different system that is remote from the accessing client data processor, and a network that interconnects the client data processor with the system that has the subject file-system is used to communicate requests and data between the two systems. Typically, software is provided on both systems that makes the remote file-system look to users/applications on the client data processor as if it was resident on a direct access storage device which was directly channel-attached to the client data file processor. Generally, the term network file service implies that the remote system that has the subject file-system must execute with its own file-system code, file-system commands that are received via the network from the client data processor's file-system code. Network file service is a different type of service than if device driver commands originating from the client data processor were to be executed on the remote system.

An operating system is software that exists between the user/application and the hardware of the data processor. The basic purpose of an operating system is to allow a plurality of users/applications to simultaneously believe that each has exclusive use of the hardware and operating system of a data processor, and at the same time to present to the users/applications a computing/programming model that is much richer and easier to use than the computing model presented by the raw hardware.

The path name for a file is the sequence of the file names of the directories, starting at the top-most directory in the hierarchy (which is referred to as the root directory), which one must pass through to reach the file in question, including the name of the file-system containing the hierarchy that contains the file, and ending with the file name of the file itself. Because there is only one such path to any particular file, this path name is unique within the hierarchy.

A sequential access storage device is a hardware device which stores a collection of blocks sequentially, and a mechanism which allows the accessing and/or altering of any one of the blocks by first accessing all blocks preceding the subject block. The time and effort to access the nth block on such a device is approximately n times the time and effort to access the first block, once the first block is accessed. Blocks may be added past the last sequential block, or blocks at the end of the sequence may be removed. Blocks on a particular sequential access storage device may vary in size. Blocks on a sequential access storage device are frequently used to archive data because the storage media is relatively inexpensive. However, sequential devices are poorly suited for the random access needed to access most file-systems. Therefore, the information on sequential devices is usually copied onto a direct access storage device prior to access. Because sequential storage devices are so frequently used as archival devices, the term archival device is used herein to mean a sequential access storage device.

A switching-channel fabric, or more simply a switching-channel or even channel switch, interconnects multiple data processors and device controllers, each of which has a fixed hardware path to the switch. At any given time the switch establishes temporary connections between pairs of connected devices. Multiple pairs may be temporarily connected, but at any given time a given pair is connected, no other device on the switch may connect to that pair.

A user is a human being who interacts with a client data processor and its operating system to perform some desired computing activity using zero or more applications.

Existing Tape Data Storage System Architectures

Figure 1:
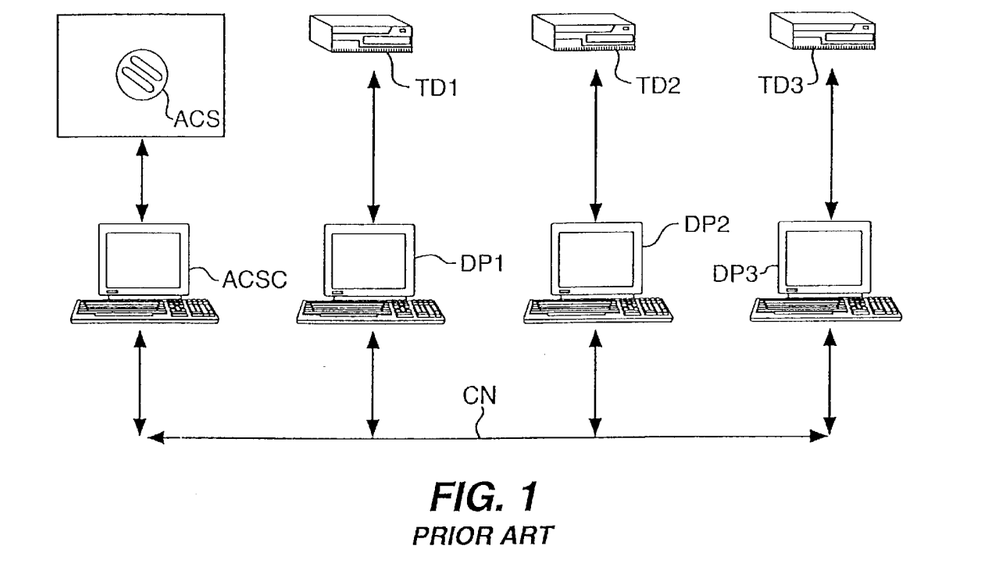
FIG. 1 illustrates in block diagram form the overall architecture of a traditional direct attached tape configuration.

FIG. 1 illustrates in block diagram form the overall architecture of a traditional direct attached tape device configuration, wherein a plurality of data processors DP1–DP3 are each directly connected to at least one tape device TD1–TD3, which tape devices TD1–TD3 for the plurality of data processors DP1–DP3 are served by an automated tape cartridge library system ACS and its associated automated tape cartridge library system controller ACSC. The data processors DP1–DP3 communicate with the automated tape cartridge library system controller ACSC via a bus CN. The automated tape cartridge library system controller ACSC receives data file access requests from the data processors DP1–DP3 and allocates a designated tape cartridge located in the automated tape cartridge library system ACS to serve the request. The automated tape cartridge library system controller ACSC transmits commands to the automated tape cartridge library system ACS to retrieve the selected tape cartridge from its cartridge storage location in the automated tape cartridge library system ACS and mount the retrieved tape cartridge on the tape device TD1–TD3 directly connected to the requesting data processor DP1–DP3. The automated tape cartridge library system controller ACSC transmits commands to the requesting data processors DP1–DP3 when the selected tape cartridge is mounted in the identified tape device TD1–TD3 to indicate that the requested data is presently available on the identified tape device TD1–TD3.

Figure 2:
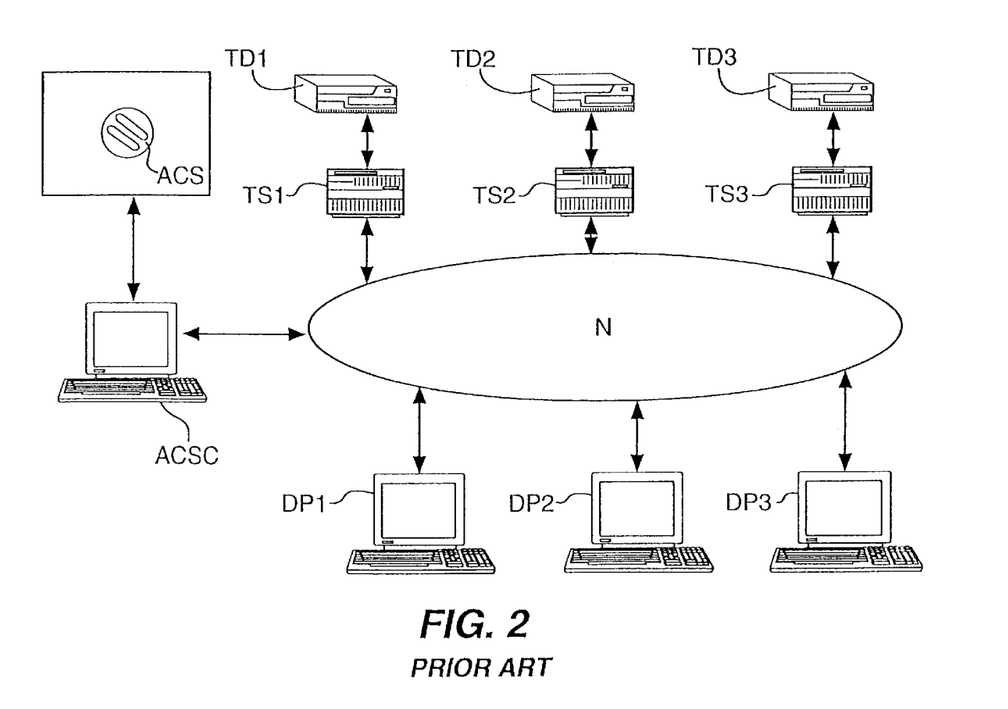
FIG. 2 illustrates in block diagram form the overall architecture of a traditional client/server network attached tape configuration.

FIG. 2 illustrates in block diagram form the overall architecture of a traditional client/server network attached tape configuration which is similar in operation to the system of FIG. 1. The differences are that the data processors DP1–DP3 are no longer directly connected to the tape devices TD1–TD3, but share the plurality of tape devices TD1–TD3 among the data processors DP1–DP3. The communications among the data processors DP1–DP3, tape devices TD1–TD3 and automated tape cartridge library system controller ACSC are effected via a common network N which transmits both data and control information therebetween. Each of the tape devices TD1–TD3 are all located behind a corresponding server TS1–TS3, using a SCSI interface, and is a static configuration, difficult to scale to changing data storage needs.

Figure 3:
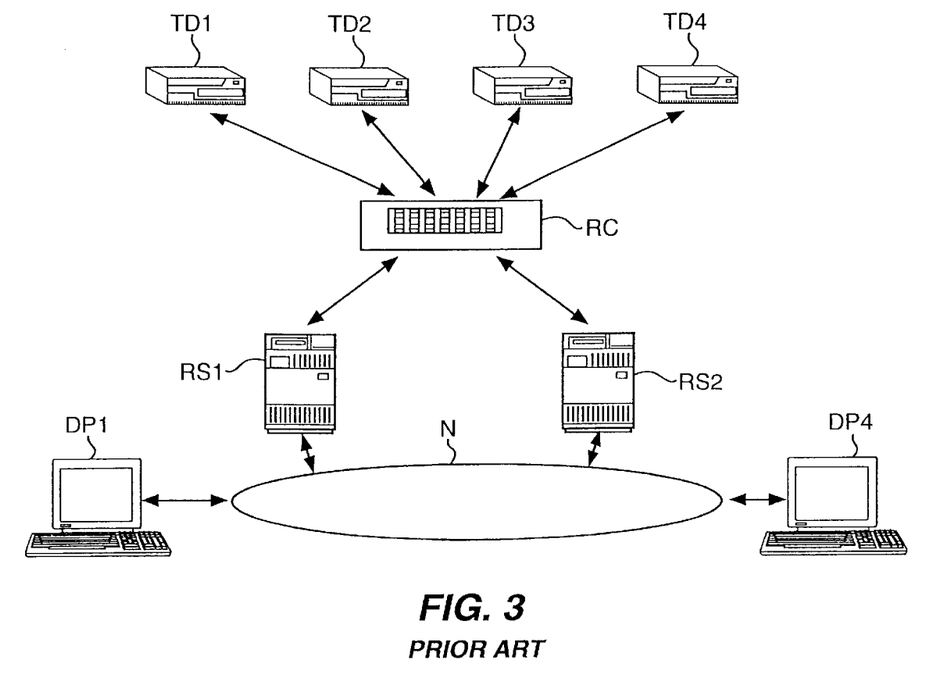
FIG. 3 illustrates in block diagram form the overall architecture of a traditional network attached RAIT tape configuration.

FIG. 3 illustrates in block diagram form the overall architecture of a traditional network attached RAIT tape array configuration where the individual tape devices of FIG. 2 are replaced by an array of tape devices TD1–TD4. The tape devices TD1–TD4 are configured in a redundant array of data storage devices in a manner analogous to the Redundant Array of Inexpensive Disks (RAID) which is a well known architecture in the disk device technology. The operation of a RAID system, and by extension, the corresponding operation of the RAIT system is not described in detail herein, since such information is readily available in the literature. The RAIT system includes a RAIT controller RC which is connected to the network N via a plurality of servers RS1–RS2. The traditional RAIT is located behind a server, using a SCSI interface, and is a static configuration, difficult to scale to changing data storage needs.

Figure 4:
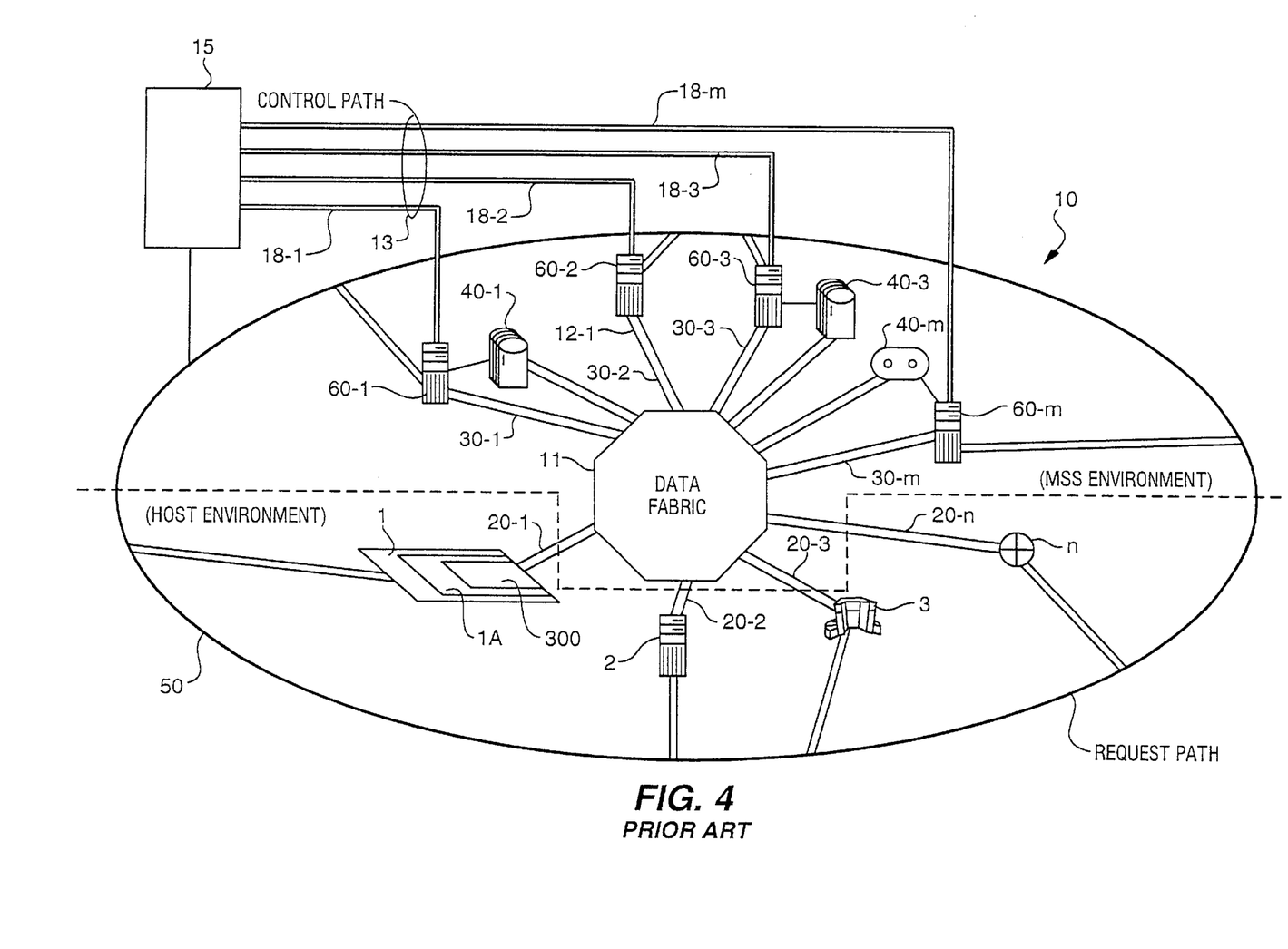
FIG. 4 illustrates in block diagram form the overall architecture of a prior art network connected mass storage system which uses a multitude of data storage devices.

FIG. 4 illustrates in block diagram form the overall architecture of a prior art network connected mass storage system which uses a multitude of data storage devices, which is described in additional detail below.

Mass Storage Systems

Figure 5:
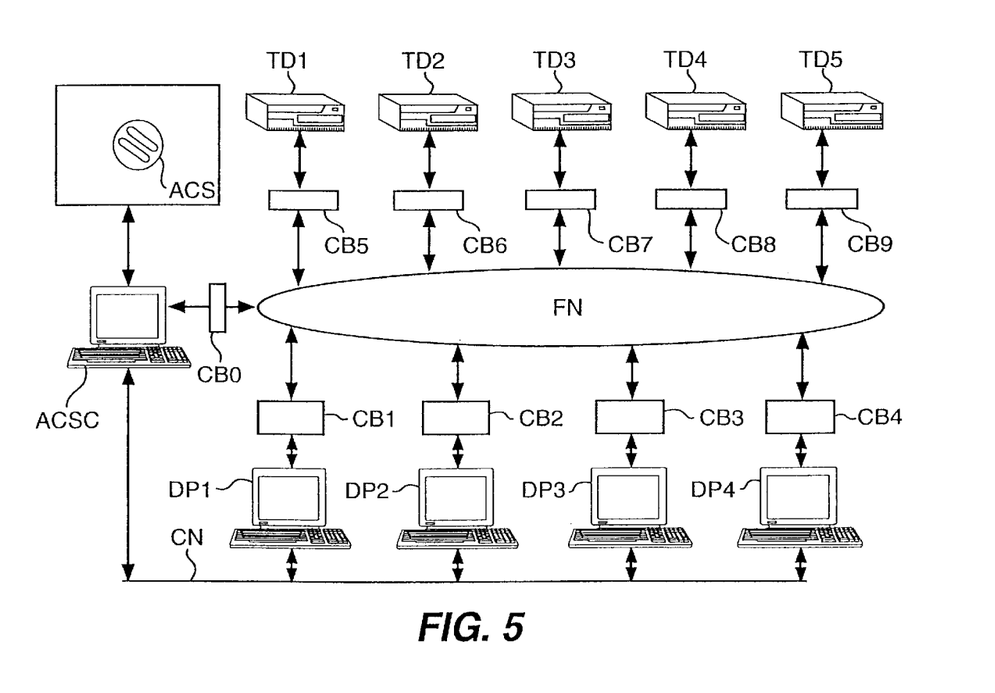
FIG. 5 illustrates in block diagram form the overall architecture of an embodiment of the network attached virtual tape storage subsystem of the present invention.

The prior art mass storage system 10 described in the Sloan et al paper is implemented using three different communication paths as shown in FIG. 5. The bit file server 15 is the sole interface to the mass storage system 10 by client data processors 1-n, and manages all bit file aspects of client data processors' file-systems, such as file-system mounting and dismounting. On the other hand, all access by client data processors of file-system data blocks occurs through the channel switching-fabric 11, without intervention by the bit file server 15. In particular, the main task of the bit file server 15 is to manager the task of staging, that is copying file-systems back and forth between archival storage devices and direct access storage devices, and maintaining logical connections between client data processors 1-n and file-systems resident on direct access storage devices.

A network mount request/relay path 50 connects operating systems resident on client data processors 1-n to the bit file server 15, and is the sole path between mass storage system 10 and the client data processors 1-n for passing information related to the staging, that is copying, of file-systems between archival storage devices and direct access storage devices, and for passing information related to the management of logical connections between the client data processors 1-n and file-systems resident on mass storage system 10 direct access storage devices. The network mount request/reply path 50 is implemented as a FDDI ring on mass storage system 10, though other network technologies could be used as well.

Under the command of the bit file server 15, the storage servers 60-1 to 60-m manage individual archival and direct access storage devices. Each storage server is responsible for maintaining mapping information regarding the collection of file-systems on its associated storage device. In the case of a direct access storage device, the associated storage server must maintain a map of which disk blocks are currently allocated to which file-systems, and which blocks are available for new use. In the case of an archival device, the associated storage server must maintain a map of which media portions contain which file-systems, and which media portions are available for new use. Under command of the bit file server 15, storage servers also direct the actions of their associated storage devices regarding file-system staging (copying). This direction occurs through special paths 18-1 and 18-m that exist between each storage server and its associated storage device. Depending upon the intelligence of the storage device's controller, direction by a storage server of a copy operation may be very minimal or it may be quite extensive. In some cases, a single command to the storage device from its storage server may be sufficient, while in other cases, the storage server must issue a command for each data block to be transferred. Additionally in some cases a pair of storage servers may need to communicate extensively with each other as well as their own associated devices.

A control path 13 is provided to connect the bit file server 15 and the data storage servers 60-1 to 60-m to one another. This control path 13 is not physically or logically accessible by the client operating systems 1A resident on client data processors 1-n. Because a high communications bandwidth is not needed for control path activity, the control path 13 can be implemented by means of an Ethernet network which is compatible with many commercially available data storage subsystems, although other network technologies could be used as well.

A third communication path is a high speed channel switching fabric 11 that provides switched-channel connections among data storage devices 40-1 to 40-m and the client data processors 1-n. The channel switching-fabric 11 is implemented using a high speed switch featuring HIPPI-compatible channels, though other network technologies could be used as well.

Importance of the Channel-Switching Fabric for File-System Access

There is an important distinction between a network and a channel. A network is a general purpose data communications path which connects a plurality of client data processors to one another for general communications purposes. Data that moves through such a network is usually processed through many layers of software. Since both the network hardware and the network software is general purpose, neither is optimized for any particular task. In particular, general purpose network hardware and software is generally incapable of connecting client data processors and remote data storage devices at data communication transfer rates capable of driving such data storage devices at their full data transfer rates.

A channel is a special purpose communications path which is designed to connect a client data processor to a data storage device at very high data transfer rates. Data that moves through a channel is handled with simple, special-purpose, lower level of protocol and therefore with lower overhead than with a network.

The mass storage system 10 enables users and client applications to access file-systems through what appears to be a directly attached storage device via a conventional block-access storage device driver 300, yet no performance penalty occurs as would be the case with any method of accessing a storage device across a network. It is transparent to the users, applications, operating systems, client data processors, and the storage and archival devices that a plurality of block I/O requests and data for a plurality of file-systems and a plurality of staging operations move through a high performance channel switching-fabric 11, which is simultaneously handling the switching of channel connections between a plurality of client data processors 1-n and a plurality of data storage devices 40-1 to 40-m.

To effect such transparency as provided by mass storage system 10, the only major modifications necessary to the client data processor 1 operating system 1A are modifications to the client data processor device driver 300 attached to the channel switching-fabric 11. Generally, device driver modifications are not difficult since most operating systems are designed to have new device drivers easily added. The mounting code 17 is not a part of the operating system; it is generally installed as a user-level process. Therefore, the operating system code is not affected by the addition of the mounting code 17, although it is expected that slight modifications to the file-system code 203 may be necessary. Even here, the modifications are not expected to be too difficult because most file-system codes already include provisions for distinguishing between locally and remotely mounted file-systems, and also include provisions for communicating with mounting codes somewhat similar to mounting code 17.

A difficulty with the mass storage system architecture is that it is designed to interconnect archive data storage systems with the local connected data storage devices which server the data processors. There is no analogous use of the high bandwidth connection in the realm of the local connected data storage devices. Thus, the data processors are served by the traditional tape device configurations noted above, since the high bandwidth network interconnection of the mass storage systems is not implemented on a local level. In addition, there is no use of the virtual device concept in the mass storage system, where the present data needs of the data processors are used to customize the data storage operation.

System Architecture of Distributed Virtual Tape Storage Subsystem

FIG. 5 illustrates in block diagram form the overall architecture of an embodiment of the network attached virtual tape storage subsystem of the present invention.

A By pooling the tape devices TD1–TD5 together, and interconnecting them with the data processors DP1–DP4 via a fiber data network FN, these problems are overcome. This architecture uses shared pooling of tape device resources to realize multiple virtual devices, which are available to any of the data processors DP1–DP4. This architecture also enables any tape array to be realized using the tape devices TD1–TD5, including, but not limited to: RAIT 0, 1, 3, 4, 5. The tape array can be reconfigured dynamically since the network FN switchably interconnects the tape devices TD1–TD5 to the data processors DP1–DP4 under control of a networked storage manager NSM. The bandwidth of this networked distributed virtual tape device data storage subsystem is scalable and can be changed on demand and network security can be implemented.

The use of a networked storage manager NSM enables the storage devices to be managed as a pool and yet the devices are directly attached to the network FN as individual resources. The networked storage manager NSM must provide the mechanism for the enterprise management to control storage device allocation and configuration as well as other functions, such as cartridge movement and data migration. The rules which could be implemented address response time constraints, data file transfer size, data file transfer rates, data file size bounds and the like. The networked storage manager NSM manages the allocation, configuration and security.

The networked storage manager NSM for the distributed virtual tape data storage subsystem contains a plurality of software elements including: resource allocation RA, resource configuration RC, and resource management RM. It may also contain security software for authentication. The resource allocation RA software has the responsibility to keep track of the resource usage such as which data processor DP1 presently owns a tape device TD3, which of the plurality of tape devices TD1–TD5 are free to be allocated to requesting data processors and the like. The resource configuration RC software allows the operator to configure the resources for the data processors DP1–DP4 which are attached to the network FN. The operator can assign the maximum number of tape devices that a data processor can have and also define the configuration of the tape devices. The resource configuration RC software automatically configures both the tape devices TD1–TD5 allocated to a data processor DP1–DP4 as well as the connection between the data processor and a tape device(s). The resource management RM software queues the request for the resource allocation and notifies the data processor when the requested resource is ready, or it can schedule the availability of the resources.

Fiber Channel Network

A SCSI interface is a bus topology, and all devices that are connected to the SCSI bus share the bus bandwidth, with only a single device being capable of accessing the bus at a time. As more devices are attached to the SCSI bus, the contention for the bus increases and this technology prevents the creation of a scalable system. The SCSI interface is not designed for switched point-to-point operation, although it can be converted to this use by the implementation of a SCSI-to-fiber bridge. In contrast to the SCSI bus, the fiber channel fabric is capable of data rates (1 Gbit/sec) far in excess of the SCSI bus and is also expandable to up to 190 ports.

In order to incorporate the SCSI bus into this distributed virtual tape storage subsystem architecture, each SCSI device (DP1–DP4, TD1–TD5) is equipped with a SCSI-to-fiber channel bridge CB1-CB9, and all of the SCSI-to-fiber channel bridges CB1-CB9 are connected to the fiber channel network FN. Each SCSI-to-fiber channel bridge CB1-CB9 has its own unique Bridge Node ID and each device connected to a SCSI-to-fiber channel bridge CB1-CB9 also has its own SCSI ID. The nexus for a logical connection is of the form:

<HOST SCSI ID><HOST BRIDGE ID><TARGET BRIDGE ID><TARGET SCSI ID>

The fiber channel network FN is controlled by means of a network resource allocation RA manager which is embedded in the automated cartridge library system controller ACSC. The network resource allocation RA manager software executes on a separate device, such as a SPARC work station, which is connected to the fiber channel network FN via a SCSI-to-fiber bridge CB0. The automated cartridge library system controller ACSC and all of the data processors DP1–DP4 are interconnected via an Ethernet control network CN.

In operation, a data processor DP1 initiates a request to access a selected data volume which is managed by the automated tape cartridge library system ACS. The data processor DP1 transmits this request to the automated tape cartridge library system software which resides in the automated cartridge library system controller ACSC via the control network CN. The automated tape cartridge library system software receives the request and ascertains the physical location of the physical medium which contains the selected data volume. The automated tape cartridge library system software also identifies an available tape device TD4 which is served by the automated tape cartridge library system ACS and which is connected to the fiber channel network FN. The automated tape cartridge library system software transmits control signals to the automated tape cartridge library system ACS to initiate the mounting of the physical medium which contains the selected data volume on the identified tape device TD4. Once the tape mount is successful, the automated tape cartridge library system software notifies the network resource allocation RA manager software via the control network CN and the network resource allocation RA manager software transmits a RESERVED command to the SCSI-to-fiber channel bridge CB8 which serves the identified tape device TD4, to reserve the identified tape device TD4 for the data processor DP1 that has the network address <HOST SCSI ID><HOST BRIDGE ID>. The network resource allocation RA manager software also transmits a TARGET BRIDGE ID command to the SCSI-to-fiber channel bridge CB1 that serves the requesting data processor DP1 to thereby identify the SCSI-to-fiber channel bridge CB8 that serves the identified tape device TD4. Once the network resource allocation RA manager software reserves the identified tape device TD4 for the requesting data processor DP1, it returns a status message to the automated tape cartridge library system software indicating a successful status. The requesting data processor DP1 can now transmit SCSI commands to the identified tape device TD4 via the fiber channel network FN. Data processor DP1 has device driver software that satisfies the various virtual device configurations of the tape devices TD1–TD5 that are part of the virtual tape data storage subsystem.

When the requesting data processor DP1 completes the desired operations, the requesting data processor DP1 transmits a DISMOUNT command via the control network CN to the automated tape cartridge library system software. Upon receipt of the DISMOUNT command, the automated tape cartridge library system software notifies the network resource allocation RA manager software, also via the control network CN, of the received DISMOUNT command. The network resource allocation RA manager software transmits a RELEASE command to the SCSI-to-fiber channel bridge CB9 that serves the identified tape device TD4. The automated tape cartridge library system software deallocates the identified tape device TD4 in its resource table and returns a successful status to the requesting data processor DP1 via the control network CN. The identified tape device TD4 is then available to be used by any data processor.

Tape Array Configuration

If the request issued by the data processor DP1 is for a tape array configuration of the data storage subsystem, such as RAIT 3 (3 data drives +1 parity drive), the number of tape devices allocated is 4. One tape device is the parity storage device while the remaining tape devices are the data storage devices. Under normal tape array operation, the data processor DP1 transmits the data and the data processor generated parity information to the tape array. The data processor DP1 manages the distribution of the data, for example, block striping to distribute the data across the four tape devices which comprise the tape array. In this instance, block 1 of the data is sent by data processor DP1 to data device 1, block 2 of the data is sent by data processor DP1 to data device 2, block 3 of the data is sent by data processor DP1 to data device 3 and the parity block is generated by the data processor DP1 XORing data block 1, data block 2, data block 3. The parity block is then transmitted by data processor DP1 to the parity data device. In this process, the data processor DP1 transmits four blocks of data to the tape array.

A more efficient process uses the capability of the fiber channel network FN to multicast the data and the tape device ability to XOR the received data blocks. At the time that the data block 1 is transmitted by data processor DP1 to a first tape device TD1, this data block is also transmitted by data processor DP1 to the parity tape device (ex- TD5), by instructing the fiber channel network FN to multicast the data block to the parity tape device TD5. Similar operations are performed with data block 2 and data block 3 and their corresponding data storage tape devices. Once the last data block is received by the parity tape device TD5, these data blocks are XORed by the parity tape device TD5 to produce the parity block of data. The parity block of data is then written by the parity tape device TD5 to the recording medium. The number of data blocks transmitted by data processor DP1 through the fiber channel network FN in this process are three rather than the four of the previous process. Data processing bandwidth is therefore conserved.

Tape Array Features

Figure 6:
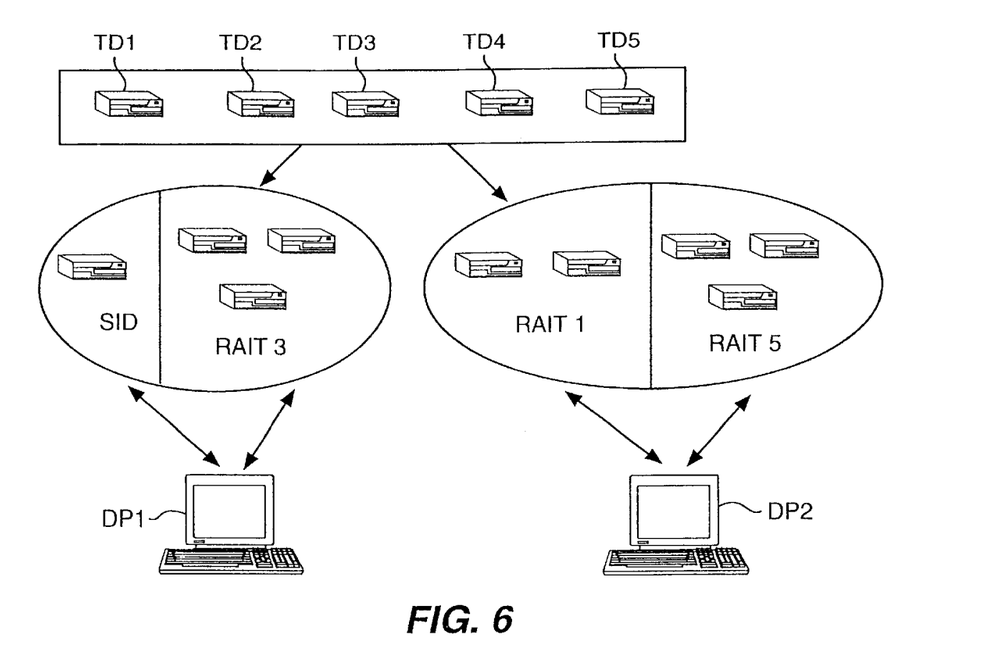
FIGS. 6 and 7 illustrate in block diagram form the overall architecture of the dynamic mapping and data striping functions, respectively, of the network attached virtual tape storage subsystem of the present invention.
Figure 7:
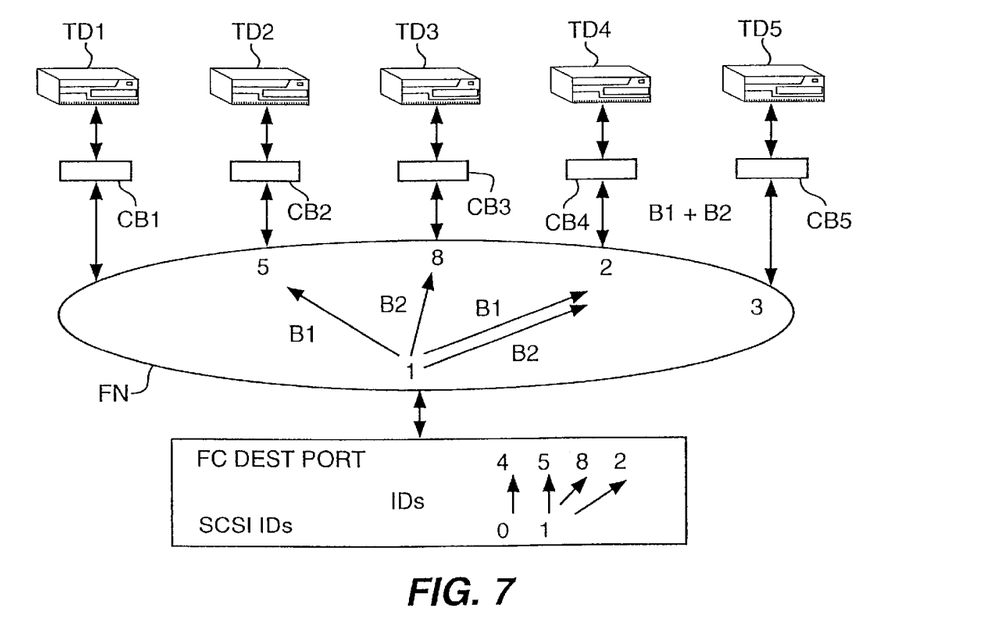

FIGS. 6 and 7 illustrate in block diagram form the overall architecture of the dynamic mapping and data striping functions, respectively, of the network attached virtual tape storage subsystem. In particular, FIG. 6 illustrates the concept of interconnecting the data processors DP1, DP2 with a plurality of data storage subsystem images. The plurality of tape devices TD1–TD5 can be configured in any of a number of subsystem configurations. FIG. 6 illustrates that one TD1 of the tape devices TD1–TD5 can be directly connected to the data processor DP1 or a plurality TD3–TD5 of the tape devices TD1–TD5 can be connected to the data processor DP1 in a RAIT 3 configuration. The configuration of the tape devices TD1–TD5 is effected by the networked storage manager NSM on a dynamic basis as a function of the data storage needs of the data processor DP1. Similarly, data processor DP2 can be interconnected with tape devices TD2, TD4 in a RAIT 1 configuration as well as to tape devices TD2, TD4, TD1 in a RAIT 5 configuration. The particular tape devices which are selected for the interconnection are selected dynamically by the networked storage manager NSM.

FIG. 7 illustrates the concept of striping the data across a plurality of the tape devices TD1–TD5. In the example of FIG. 7, the data is written concurrently to two tape devices at a time, using the multicast capability of the fiber channel network FN. The selection of the two tape devices is controlled by the networked storage manager NSM by simple designating different fiber channel network ports for the writing of the data. Thus, the striping of the data can be to tape devices TD2, TD3 via ports 4, 5 and thence to tape devices TD4, TD5 via network ports 8, 2.

What is claimed:

1. A distributed virtual storage system for accessing data files on a plurality of storage media by a plurality of data processors, comprising:

a plurality of devices for providing at least one of said plurality of data processors with access to at least one of said data files stored on at least two of said plurality of storage media;

a network interconnecting said plurality of data processors and said plurality of devices; and means for managing storage of data on said plurality of storage media, wherein said means for managing storage of data comprises:

means for creating a virtual device by associating at least two of said devices together for substantially concurrently reading/writing data on said at least two of said plurality of storage media; and means for creating another virtual device by dynamically reconfiguring at least some of the plurality of devices, said another virtual device having characteristics different from the virtual device.

2. The distributed virtual storage system of claim 1 wherein said means for creating a virtual device comprises:

means, responsive to said at least one of said plurality of data processors requesting access to a selected data file, for allocating at least two of the plurality of storage devices for access of said selected data file.

3. The distributed virtual storage system of claim 2 wherein said means for managing storage of data further comprises:

means for mounting a storage media into each of the allocated storage devices.

4. The distributed virtual storage system of claim 3 wherein said means for managing storage of data further comprises:

means for transmitting data to said at least one of said plurality of data processors via the control path to identify said at least two devices to access said selected data file by said at least one data processor via said network.

5. The distributed virtual storage system of claim 4 wherein said means for transmitting data transmits an identification of a port on said network for each of said at least two devices.

6. The distributed virtual storage system of claim 1 further comprising:

a plurality of network interfaces, each connected between a one of said plurality of devices and said network.

7. The distributed virtual storage system of claim 6 wherein said devices include a SCSI interface and said network comprises a fiber channel network, said network interfaces comprise a SCSI to fiber channel converter.

8. The distributed virtual storage system of claim 1 wherein said network comprises a multicast network for concurrently transmitting data to a plurality of said devices connected to said network.

9. The distributed virtual storage system of claim 1 wherein said network comprises a non-blocking high bandwidth switching network.

10. The distributed virtual storage system of claim 1 wherein said means for managing storage of data further comprises:

means for storing mapping data indicative of a correspondence between data processor data files and physical data storage locations in said plurality of storage media used to store said data files;

means, responsive to at least one of said plurality of data processors requesting access to an identified data file, for selecting ones of said storage media which contain said identified data file based upon said data file mapping data; and means for activating a library to mount said selected storage media on selected ones of said plurality of devices for access of said identified data file by said requesting data processor via said network.

11. A distributed virtual storage system for accessing data files on a plurality of storage-media by at least one data processor, comprising:

a plurality of devices for accessing said plurality of storage media;

a network interconnecting said at least one data processor and said plurality of devices; and means, responsive to a one of said at least one data processor requesting access to a data file, for dynamically creating a virtual device comprising at least two of the devices for substantially concurrently accessing data on at least two of said plurality of storage media.

12. The distributed virtual storage system of claim 11, wherein the virtual device comprises a first array type of any one of RAIT 0, RAIT 1, RAIT 3, RAIT 4 and RAIT 5.

13. The distributed virtual storage system of claim 11, further comprising means for dynamically creating a second virtual device comprising at least two of the devices for substantially concurrently accessing data on at least two of the plurality of storage media.

14. The distributed virtual storage system of claim 13, wherein the virtual device and second virtual device have different characteristics.

15. The distributed virtual storage system of claim 13, wherein the means for dynamically creating a second virtual device uses at least one of the at least two devices associated with the virtual device.

16. A method for managing a distributed virtual storage system for accessing data files on a plurality of storage media by at least one data processor, said distributed virtual storage system comprising a plurality of devices for providing said at least one data processor with access to at least one of said data files stored on said plurality of storage elements, a library for robotically handling said plurality of storage media for mounting/dismounting storage media on said plurality of devices, a network interconnecting said at least one data processor and said plurality of devices, and a storage manager that manages said plurality of devices, wherein said method comprises the steps of:

using said storage manager to create a virtual device by connecting at least two of said devices for substantially concurrently reading/writing data on said at least two of said plurality of storage media;

activating said library to robotically mount said at least two storage media in said at least two devices; and using said network to transmit data between one of said at least one data processor and said at least two of said devices without intervention by said storage manager.

17. The method of claim 16 wherein said method further comprises the step of:

allocating, in response to a one of said at least one data processor requesting storage of a selected data file, at least two of the plurality of storage devices for access of said selected data file.

18. The method of claim 17 wherein said method further comprises the step of:

mounting a storage media into each of the allocated storage devices by the library.

19. The method of claim 18 wherein said method further comprises the step of:

transmitting data to said at least one data processor to identify said at least two devices to access said selected data file by said at least one data processor via said network.

20. The method of claim 19 wherein said step of transmitting data comprises:

transmitting an identification of a port on said network for each of said at least two devices.

21. The method of claim 16 further comprising the steps of:

storing mapping data indicative of a correspondence between data processor data files and physical data storage locations in said plurality of storage media used to store said data files;

selecting, in response to a one of said data processors requesting access to an identified data file, ones of said storage media which contain said identified data file based upon said data file mapping data; and activating said library to mount said selected storage media on selected ones of said plurality of devices for access of said identified data file by said requesting data processor via said network.

22. A method for managing a distributed storage system for accessing data files on a plurality of storage media by at least one data processor, said distributed storage system comprising a plurality of devices for providing said at least one data processor with access to a plurality of data files stored on said plurality of storage elements, a network interconnecting said at least one data processor and said plurality of devices, and a storage manager that manages said plurality of devices, wherein said method comprises the steps of:

switchably interconnecting at least some of the plurality of devices, as directed by the storage manager, into a first virtual configuration for access of a one of said plurality of data files by said at least one data processor; and using said network to transmit data between one of said at least one data processor and said at least some of the plurality of said devices without intervention by said storage manager.

23. The method of claim 22, further comprising the step of switchably interconnecting at least some of the plurality of devices, as directed by the storage manager, into a second virtual configuration for access of another of said plurality of data files by said at least one data processor.

24. The method of claim 23, wherein the first virtual configuration is a type of RAIT configuration and the second virtual configuration is another type of RAIT configuration.

25. The method of claim 23, wherein the first virtual configuration and the second virtual configuration have different characteristics.

26. The method of claim 25, wherein the different characteristics are different performance characteristics.

* * * * *